US012217496B2

(12) United States Patent
Zhou et al.

(10) Patent No.: US 12,217,496 B2
(45) Date of Patent: Feb. 4, 2025

(54) HAND GESTURE DETECTION METHOD INVOLVES ACQUIRING INITIAL DEPTH IMAGE USING BACKBONE AND APPARATUS, AND NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventors: Yang Zhou, Palo Alto, CA (US); Jie Liu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 415 days.

(21) Appl. No.: 17/748,907

(22) Filed: May 19, 2022

(65) Prior Publication Data

US 2022/0277595 A1    Sep. 1, 2022

Related U.S. Application Data

(63) Continuation of application No. PCT/CN2020/129258, filed on Nov. 17, 2020.

(Continued)

(51) Int. Cl.
*G06V 10/25*  (2022.01)
*G06T 7/50*   (2017.01)
(Continued)

(52) U.S. Cl.
CPC ............ *G06V 10/82* (2022.01); *G06T 7/50* (2017.01); *G06T 7/75* (2017.01); *G06V 40/10* (2022.01);
(Continued)

(58) Field of Classification Search
None
See application file for complete search history.

(56) References Cited

U.S. PATENT DOCUMENTS

| 8,125,673 B2 * | 2/2012 | Nagasawa ............ H04N 1/2158 |
| | | 358/1.15 |
| 2014/0002837 A1 * | 1/2014 | Miyamoto ......... H04N 1/00822 |
| | | 358/1.13 |

(Continued)

FOREIGN PATENT DOCUMENTS

| CN | 105389539 A | 3/2016 |
| CN | 106846403 A | 6/2017 |

(Continued)

OTHER PUBLICATIONS

International Search Report and Written Opinion dated Feb. 19, 2021 in International Application No. PCT/CN2020/129258. English translation attached.

(Continued)

*Primary Examiner* — Haris Sabah
(74) *Attorney, Agent, or Firm* — Sheppard, Mullin, Richter & Hampton LLP

(57) ABSTRACT

Provided are a hand gesture detection method and device, and a computer storage medium. The method includes: obtaining an initial depth image including a hand to be detected, and performing detection processing on the initial depth image by using a backbone feature extractor and a bounding box detection model to obtain initial bounding (Continued)

boxes and a first feature map corresponding to the hand to be detected; determining one of the initial bounding boxes as a target bounding box; cropping, based on the target bounding box, the first feature map by using RoIAlign feature extractor, to obtain a second feature map corresponding to the hand to be detected; and performing, based on the second feature map, a three-dimensional gesture estimation processing on the hand to be detected by using a gesture estimation model to obtain a gesture detection result of the hand to be detected.

19 Claims, 9 Drawing Sheets

Related U.S. Application Data

(60) Provisional application No. 62/938,176, filed on Nov. 20, 2019.

(51) Int. Cl.
  *G06T 7/73* (2017.01)
  *G06V 10/82* (2022.01)
  *G06V 40/10* (2022.01)
  *G06V 40/20* (2022.01)
  *G06V 10/80* (2022.01)

(52) U.S. Cl.
  CPC .... *G06V 40/28* (2022.01); *G06T 2207/10028* (2013.01); *G06T 2207/20081* (2013.01); *G06T 2207/20132* (2013.01); *G06V 10/803* (2022.01)

(56) References Cited

U.S. PATENT DOCUMENTS

| | | | |
|---|---|---|---|
| 2017/0192515 A1* | 7/2017 | Menadeva | G06F 3/04812 |
| 2020/0293138 A1* | 9/2020 | Minami | G06F 3/1279 |
| 2021/0168249 A1* | 6/2021 | Shiotani | H04N 1/00474 |

FOREIGN PATENT DOCUMENTS

| | | |
|---|---|---|
| CN | 107066935 A | 8/2017 |
| CN | 108549878 A | 9/2018 |
| CN | 109993130 A | 7/2019 |

OTHER PUBLICATIONS

He et al., "Mask R-CNN", Facebook AI Research (FAIR), arXiv:1703.06870v3 (Jan. 24, 2018), 12 pages.

* cited by examiner

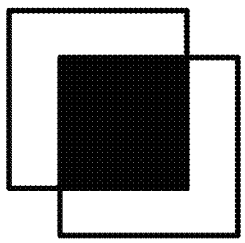
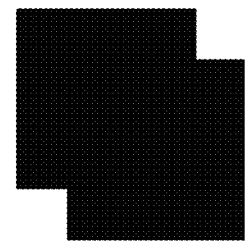
Fig. 8a　　　　　　　　　　Fig. 8b
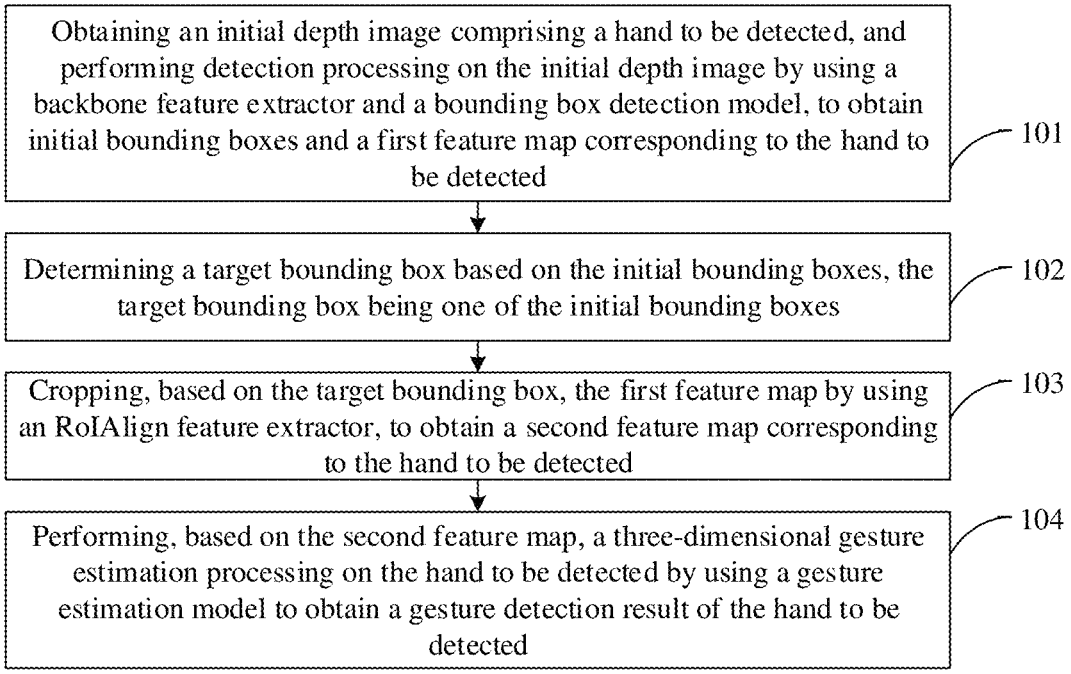
Fig. 9

HAND GESTURE DETECTION METHOD INVOLVES ACQUIRING INITIAL DEPTH IMAGE USING BACKBONE AND APPARATUS, AND NON-TRANSITORY COMPUTER-READABLE STORAGE MEDIUM

This application is a continuation of International Application No. PCT/CN2020/129258, filed on Nov. 17, 2020, which claims priority to an earlier U.S. provisional patent application No. 62/938,176, filing on Nov. 20, 2019 and entitled "CASCADED HAND DETECTION AND 3D HAND GESTURE ESTIMATION FOR A MOBILE TOF CAMERA". The disclosures of the aforementioned applications are hereby incorporated by reference in their entireties.

FIELD

The embodiments of the present disclosure relate to the technical field of image recognition, and in particular, to a hand gesture detection method, a hand gesture detection apparatus, and a computer storage medium.

BACKGROUND

The ability to accurately and efficiently reconstruct the motion of the human hand from images promises exciting new applications in immersive virtual and augmented realities, robotic control, and sign language recognition. There has been great progress in recent years, especially with the arrival of consumer depth cameras.

However, it remains a challenging task due to unconstrained global and local pose variations, frequent occlusion, local self-similarity, and a high degree of articulation.

SUMMARY

The present disclosure provides a hand gesture detection method, a hand gesture detection apparatus, and a computer storage medium, which can greatly improve the detection efficiency and accuracy of the hand gesture.

The technical solutions of the present disclosure can be realized as follows.

In a first aspect, an embodiment of the present disclosure provides a hand gesture detection method. The method includes: obtaining an initial depth image comprising a hand to be detected, and performing detection processing on the initial depth image by using a backbone feature extractor and a bounding box detection model, to obtain initial bounding boxes and a first feature map corresponding to the hand to be detected; determining a target bounding box based on the initial bounding boxes, the target bounding box being one of the initial bounding boxes; cropping, based on the target bounding box, the first feature map by using an RoIAlign feature extractor, to obtain a second feature map corresponding to the hand to be detected; and performing, based on the second feature map, a three-dimensional gesture estimation processing on the hand to be detected by using a gesture estimation model to obtain a gesture detection result of the hand to be detected.

In a second aspect, an embodiment of the present disclosure provides a hand gesture detection apparatus. The hand gesture detection apparatus includes: an obtaining component, a detection component, a determining component, a cropping component, an estimation component. The obtaining unit is configured to obtain an initial depth image including a hand to be detected. The detection component is configured to perform detection processing on the initial depth image by using a backbone feature extractor and a bounding box detection model to obtain initial bounding boxes and a first feature map corresponding to the hand to be detected. The determining component is configured to determine a target bounding box based on the initial bounding boxes, the target bounding box being one of the initial bounding boxes. The cropping component is configured to crop, based on the target bounding box, the first feature map by using an RoIAlign feature extractor to obtain a second feature map corresponding to the hand to be detected. The estimation component is configured to perform, based on the second feature map, a three-dimensional gesture estimation processing on the hand to be detected by using a gesture estimation model to obtain a gesture detection result of the hand to be detected.

In a third aspect, an embodiment of the present disclosure provides a hand gesture detection apparatus. The hand gesture detection apparatus includes a processor and a memory having instructions stored thereon and executable by the processor. The instructions, when executed by the processor, implement the above-described hand gesture detection method.

In a fourth aspect, an embodiment of the present disclosure provides a computer storage medium having a program stored thereon and applied to a hand gesture detection apparatus. The program, when executed by a processor, implements the above-mentioned hand gesture detection method.

In the hand gesture detection method provided by the embodiments of the present disclosure, the hand gesture detection apparatus obtains the initial depth image including a hand to be detected, and performs the detection processing on the initial depth image by using a backbone feature extractor and a bounding box detection model, to obtain initial bounding boxes and a first feature map corresponding to the hand to be detected; based on the initial bounding boxes, the hand gesture detection apparatus determines a target bounding box, which is one of the initial bounding boxes; based on the target bounding box, the hand gesture detection apparatus crops the first feature map using an RoIAlign feature extractor, to obtain the second feature map corresponding to the hand to be detected; based on the second feature map, the hand gesture detection apparatus performs three-dimensional gesture estimation processing on the hand to be detected using a gesture estimation model, to obtain a gesture detection result of the hand to be detected. In other words, in the embodiments of the present disclosure, when the hand gesture detection apparatus performs the hand gesture detection processing, it can combine the two tasks of the hand detection and the hand gesture estimation end-to-end. Specifically, the hand gesture detection apparatus can couple the output result of the hand detection with the input end of the hand gesture estimation through the RoIAlign feature extractor, and it can use the second feature map output by the RoIAlign feature extractor as the input of the gesture estimation model to complete the hand gesture detection. In view of the above, in the hand gesture detection method proposed in the embodiments of the present disclosure, the backbone feature extractor is only used to perform one feature extraction on the initial depth image, thereby achieving the joint processing of the hand detection and the hand gesture estimation. Therefore, the amount of computation can be greatly reduced, and the detection efficiency and accuracy of the hand gesture can be effectively improved.

BRIEF DESCRIPTION OF DRAWINGS

FIG. 8a and FIG. 8b are schematic diagrams of a union and an intersection in the related art.

FIG. 9 is a first schematic flowchart of a hand gesture detection method according to an embodiment of the present disclosure.

DESCRIPTION OF EMBODIMENTS

In order to have a more detailed understanding of the features and technical contents of the embodiments of the present disclosure, the implementation of the embodiments of the present disclosure will be described in detail below with reference to the accompanying drawings. The accompanying drawings are only for reference and description, but are not intended to limit the embodiments of the present disclosure.

Hand gesture estimation mainly refers to an accurately estimation of a three-dimensional coordinate position of a human hand skeleton nodes from an image. It is a key issue in the fields of computer vision and human-computer interaction, and it is also of great significance in the fields such as virtual reality, augmented reality, non-contact interaction, and gesture recognition. With rise and development of commercial, inexpensive depth cameras, great progress has been made in hand gesture estimation.

The depth cameras include a structured light camera, a laser scanning camera, and a time of flight (TOF) camera, etc. In most cases, the TOF cameras are used.

Three-dimensional (3D) imaging of a time-of-flight method is to continuously transmit a light pulse to an object, and then use a sensor to receive light returned from the object, and obtain a target distance of the object by detecting flight (round-trip) time of the light pulse. Specifically, the TOF camera is a range imaging camera system, in which adopts the time-of-flight method to calculate a distance between the TOF camera and the captured object for each point in the image by measuring round-trip time of an artificial light signal provided by a laser or a light-emitting diode (LED).

Figure 1:
FIG. 1 is a schematic diagram of an image captured by a TOF camera provided in a related technical solution.

The TOF camera outputs an image with a size of H×W, and each pixel value on the two-dimensional (2D) image may represent a depth value of the pixel. The pixel value ranges from 0 to 3000 millimeter (mm). FIG. 1 is a schematic diagram of an image captured by a TOF camera provided in a related technical solution. In the embodiments of the present disclosure, the image captured by the TOF camera may be referred to as a depth image.

For example, the TOF camera provided by manufacturer OPPO differs from those made by other manufacturers in the following aspects: (1) it can be installed inside a smartphone instead of being fixed on a static bracket; (2) it has lower power consumption than those made by other manufacturers (such as Microsoft Kinect, Intel Realsense, etc.); and (3) it has lower image resolution, such as 240×180, while the typical value of image resolution is 640×480.

Figure 2:
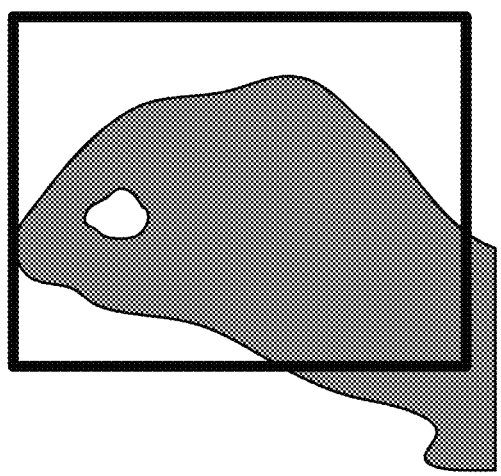
FIG. 2 is a schematic diagram of a detection result of a hand bounding box provided in a related technical solution.

It can be understood that an input of the hand detection is a depth image, and an output thereof is a probability of hand presence (i.e., a number ranging from 0 to 1, a larger value indicating a greater confidence of the hand presence) and a hand bounding box (i.e., a bounding box representing a position and a size of the hand). FIG. 2 illustrates a schematic diagram of a detection result of a hand bounding box according to a related technical solution. As illustrated in FIG. 2, the black rectangle is the hand bounding box, and a score of the hand bounding box is as high as 0.999884.

In the embodiments of the present disclosure, the bounding box may be referred to as a boundary box. The bounding box can be expressed as (xmin, ymin, xmax, ymax), where (xmin, ymin) represents an upper left corner position of the bounding box, and (xmax, ymax) represents a lower right corner position of the bounding box.

Figure 3:
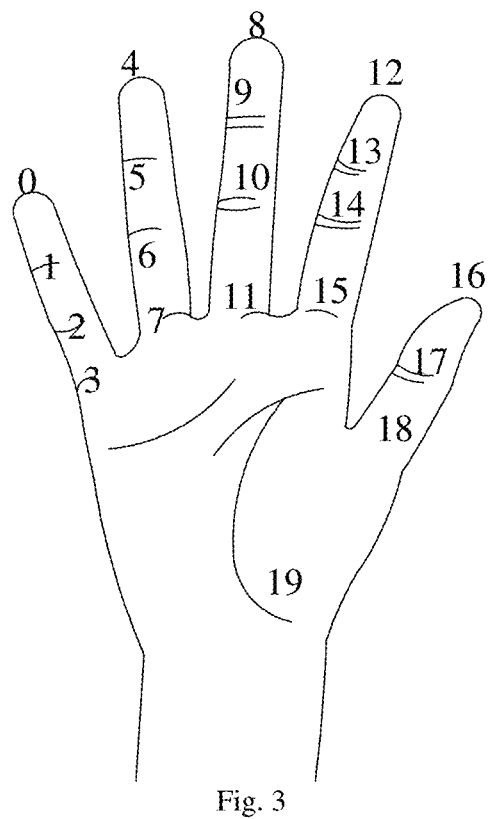
FIG. 3 is a schematic diagram of key point positions of a hand skeleton in the related art.
Figure 4:
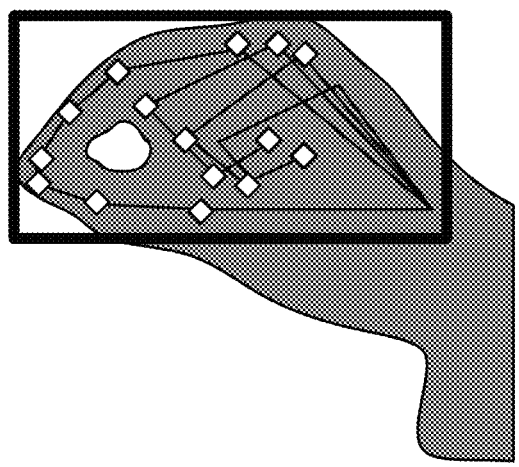
FIG. 4 is a schematic diagram of a two-dimensional hand gesture estimation result in the related art.

Specifically, in a process of 2D hand gesture estimation, an input is a depth image, and an output is a 2D key point position of a hand skeleton. An example of key point positions of a hand skeleton is illustrated in FIG. 3. FIG. 3 is a schematic diagram of key point positions of a hand skeleton in the related art. The hand skeleton can be set to have 20 key points, and the position of each key point is illustrated as 0 to 19 in FIG. 3. The position of each key point can be represented by 2D coordinate information (x,y), where x represents coordinate information in a direction of a horizontal image axis, and y represents coordinate information in a direction of a vertical image axis. Illustratively, after the coordinate information of the 20 key points is determined, a two-dimensional hand gesture detection result is illustrated in FIG. 4. FIG. 4 is a schematic diagram of a two-dimensional hand gesture estimation result in the related art.

In a process of 3D hand gesture estimation, an input is still a depth image, and an output is a 3D key point position of a hand skeleton. An example of key point positions of a hand skeleton is illustrated in FIG. 3. The position of each key point can be represented by 3D coordinate information (x,y,z), where x represents coordinate information in a direction of a horizontal image axis, y represents coordinate information in a direction of a vertical image axis, and z represents coordinate information in a depth direction. The problems to be solved by the embodiments of the present disclosure are mainly related to the three-dimensional hand gesture estimation.

Figure 5:
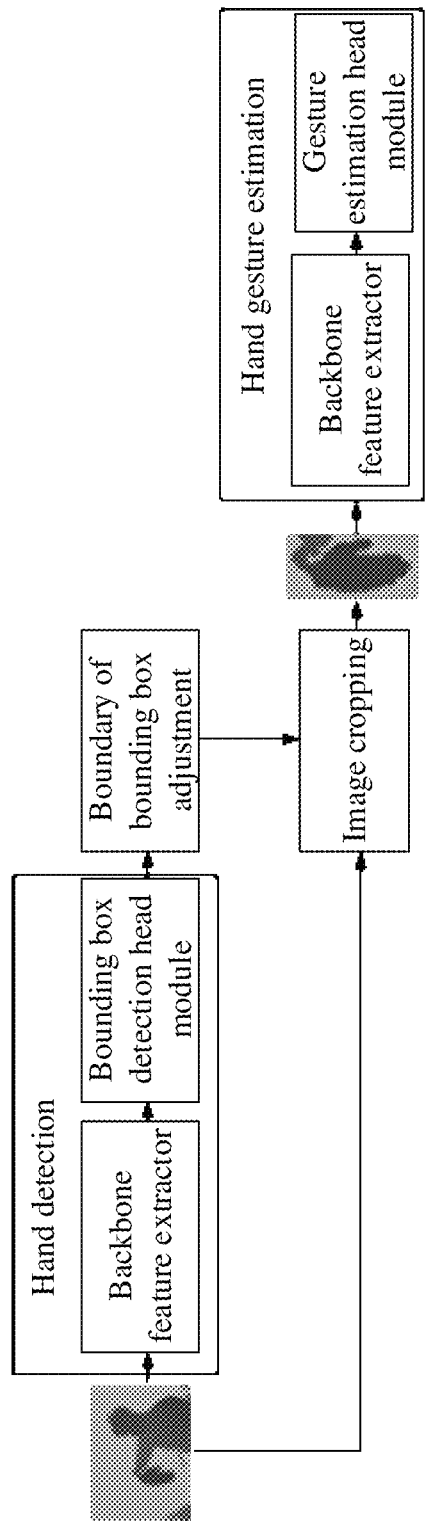
FIG. 5 is a schematic flowchart of a conventional hand gesture detection according to a related technical solution.

At present, a typical hand gesture detection process may include a hand detection part and a hand gesture estimation part. The hand detection part may include a backbone feature extractor and a bounding box detection head module, and the hand gesture estimation part may include a backbone feature extractor and a gesture estimation head module. For example, FIG. 5 is a schematic flowchart of a conventional hand gesture detection provided in a related technical solution. As illustrated in FIG. 5, after an initial depth image including a hand is obtained, the hand detection may be performed, that is, the backbone feature extractor and the bounding box detection head module included in the hand detection part are used to perform detection processing. At this time, the boundary of the bounding box can be adjusted, then an image can be cropped by using the adjusted bounding box. The hand gesture estimation is performed on the cropped image, that is, the backbone feature extractor and gesture estimation head module included in the hand gesture estimation part are used to perform gesture estimation processing. It should be noted that the tasks of the hand detection and the hand gesture estimation are completely separated. In order to couple these two tasks, the output position of the bounding box is adjusted to the mass center of pixels within the bounding box, and the bounding box is slightly enlarged to include all pixels of the hand. The initial depth image is cropped by using the adjusted bounding box. The cropped image is inputted into the hand gesture estimation. The backbone feature extractor is used twice to extract image features, which may lead to repeated computation, thereby resulting in huge amount of computation.

Figure 6:
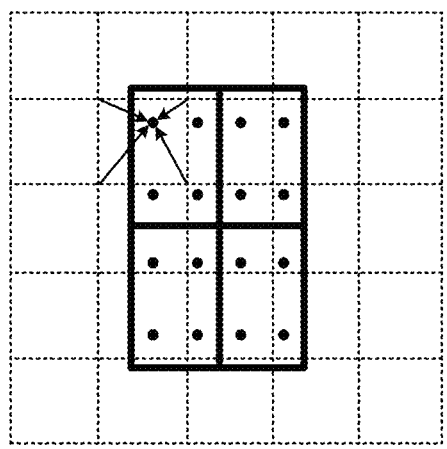
FIG. 6 is a schematic diagram of a bilinear interpolation effect of ROIAlign in the related art.

In this case, RoIAlign may be introduced. The ROIAlign is a regional feature aggregation method, which can well solve the problem of regional mismatch caused by two quantization procedures in the ROI Pool operations. In the detection task, the accuracy of the detection result can be improved by replacing the ROI Pool with the ROIAlign. That is, the RoIAlign layer removes the harsh quantization of the RoIPool and correctly aligns the extracted features with the input. Here, any quantization of RoI boundaries or bins can be avoided, e.g., x/16 can be used here instead of [x/16]. In addition, bilinear interpolation can also be used to calculate the exact values of the input features at four regularly sampled locations in each RoI bin, and the result is aggregated (using the maximum value or the average value). FIG. 6 is a schematic diagram of a linear interpolation effect in the related art. In FIG. 6, the visual grid represents a feature map, the bold solid line represents an RoI (such as 2×2 bins), and 4 sampling points are dotted in each bin. The RoIAlign uses the adjacent grid points on the feature map to perform bilinear interpolation calculations, so as to obtain the value of each sampling point. No quantization is performed on any coordinates involved in ROI, ROI bins, or the sampling points. It should also be noted that, the detection results are not sensitive to the accuracy of sampling locations or the number of the sampling points, as long as no quantization is performed.

In addition, Non-Maximum Suppression (NMS) has been widely used in several key aspects of computer vision and is a part of various detection methods such as edge, corner, or object detection. Its necessity is caused by that the imperfect ability of detection algorithms for localizing the concept of interest results in several detection groups appearing in the vicinity of the real location.

Figure 7:
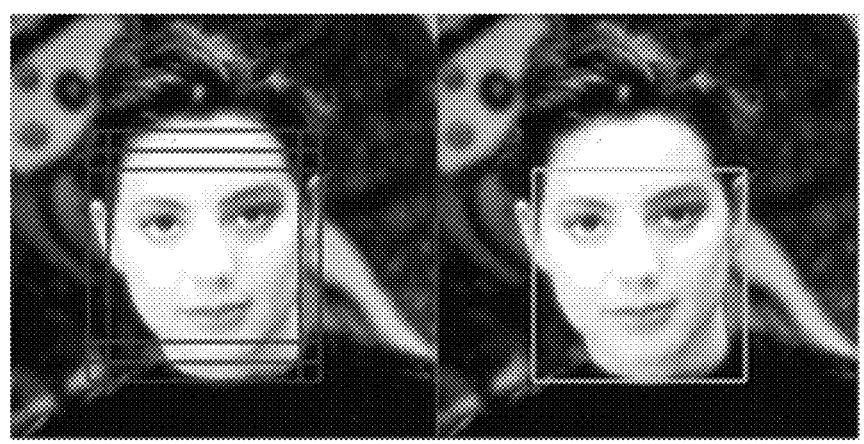
FIG. 7 is a schematic diagram illustrating an effect of non-maximum suppression in the related art.

In the context of object detection, the methods based on window-sliding often produce multiple high-scoring windows, which are close to the correct location of the object. This is a consequence of the generalization ability of the object detector, the smoothness of the response function, and the visual correlation of close-by windows. The relatively dense output is often unsatisfactory for understanding the content of an image. In fact, in this step, the assumed number of windows is uncorrelated with the real number of objects in the image. Therefore, the goal of NMS is to retain only one window per detection group, corresponding to the precise local maximum of the response function, to optimally obtain only one detection per object. FIG. 7 is a schematic diagram of an effect of non-maximum suppression in the related art. A specific example of NMS is illustrated in FIG. 7, and the NMS aims to retain one window (the bold gray rectangle in FIG. 7).

FIG. 8*a* and FIG. 8*b* are schematic diagrams of a union and an intersection in the related art. In FIG. 8*a* and FIG. 8*b*, two bounding boxes are provided and denoted by BB1 and BB2, respectively. The black area in FIG. 8*a* is the intersection of BB1 and BB2, which is denoted by BB1∩BB2, i.e., the overlapping area of B1 and BB2; and the black area in FIG. 8*b* is the union of BB1 and BB2, which is denoted by BB1∪BB2, i.e., the merged area of BB1 and BB2. Specifically, the calculation formula of the intersection-to-union ratio (represented by IoU) is presented by the following equation:

$$IoU=(\text{Area of Overlap})/(\text{Area of Union})=(BB1\cap BB2)/(BB1\cup BB2) \quad (1)$$

In the current hand gesture detection scheme, the hand detection and the hand gesture estimation are separated from each other in a typical hand gesture detection. In an offline training process, a hand detection model and a hand gesture estimation model are established, respectively, as two consecutive components in a flow line. The training data of hand gesture estimation may suffer a mismatch (compared to online inference), resulting in degraded online inference performance of the hand gesture estimation.

Meanwhile, the features previously computed by the hand detection component fail to be utilized by the current hand gesture estimation component. For each hand gesture estimation, it is required to extract the image features from the original image, which leads to a waste of computation and slower inference.

In order to solve the above two problems, these two tasks, i.e., the hand detection and the hand gesture estimation, are combined in the present disclosure. During the offline training, by connecting an output of the first task with an input of the second task, the two tasks are tightly coupled. That is, a bounding box result and the calculated image features of the hand detection task are directly inputted to the hand gesture estimation task. These two models are established through mutual influence, and thus benefit from task combination.

That is to say, in the embodiments of the present disclosure, the hand gesture detection apparatus, when performing the hand gesture detection processing, can combine the two tasks of the hand detection and the hand gesture estimation end-to-end. Specifically, the hand gesture detection apparatus can connect the output result of the hand detection to the input end of the hand gesture estimation through the RoIAlign feature extractor, and further, it can complete the hand gesture detection by using a second feature map output by the RoIAlign feature extractor as the input of the gesture estimation model. It can be seen that, in the hand gesture detection method proposed in the embodiments of the present disclosure, only the backbone feature extractor is used to perform one feature extraction on an initial depth image to achieve the joint processing of the hand detection and the hand gesture estimation, thereby greatly reducing the amount of computation and effectively improving the detection efficiency and accuracy of the hand gesture.

The embodiments of the present disclosure will be described in detail below with reference to the accompanying drawings.

An embodiment of the present disclosure provides a hand gesture detection method. FIG. 9 is a first schematic flowchart of a hand gesture detection method according to an embodiment of the present disclosure. As illustrated in FIG. 9, in the embodiment of the present disclosure, the hand gesture detection method, which is performed by a hand gesture detection apparatus, may include the following actions in blocks.

At block 101, an initial depth image including a hand to be detected is obtained, and detection processing is performed on the initial depth image by using a backbone feature extractor and a bounding box detection model, to obtain initial bounding boxes and a first feature map corresponding to the hand to be detected.

In the embodiments of the present disclosure, the hand gesture detection apparatus can obtain the initial depth image corresponding to the hand to be detected, and then can use the backbone feature extractor and the bounding box detection model to perform the detection processing on the initial depth image, so as to obtain initial bounding boxes and the first feature map corresponding to the hand to be detected.

It should be noted that, in the present disclosure, the obtained initial depth image is a depth image of the hand to be detected, that is, the initial depth image includes the hand to be detected.

It should be noted that, in the embodiments of the present disclosure, the hand gesture detection method is applicable to the hand gesture detection apparatus, or an electronic apparatus integrated with the hand gesture detection apparatus. The electronic apparatus may be a smart phone, a tablet computer, a notebook computer, a handheld computer, a personal digital assistant (PDA), a navigation apparatus, a wearable apparatus, a desktop computer, etc., which are not limited to any of these examples in the embodiments of the present disclosure.

It can be understood that, for a human hand, there may be a plurality of key nodes, i.e., key points, in the skeleton of the hand. Usually, the hand includes at least 20 key points. The specific positions of the 20 key points on the hand are illustrated in FIG. 3.

Further, in the embodiments of the present disclosure, when the hand gesture detection apparatus uses the backbone feature extractor and the bounding box detection model to perform the detection processing on the initial depth image to obtain the initial feature map and the bounding boxes, the hand gesture detection apparatus can first input the initial depth image into the backbone feature extractor, and then output the first feature map; thereafter, the hand gesture detection apparatus can obtain, based on the first feature map, the initial bounding boxes by using the bounding box detection model.

It should be noted that, in the embodiments of the present disclosure, when the hand gesture detection apparatus obtains, based on the first feature map, the initial bounding boxes by using the bounding box detection model, the hand gesture detection apparatus inputs the first feature map into the bounding box detection model, so as to output a plurality of bounding boxes and a plurality of confidences corresponding to the plurality of bounding boxes in one-to-one correspondence; and then, the hand gesture detection apparatus determines, based on the plurality of confidences, a part of the plurality of bounding boxes as the initial bounding boxes.

That is to say, in the present disclosure, when the hand gesture detection apparatus uses the bounding box detection model, the plurality of bounding boxes can be obtained by using the confidences of the bounding boxes, that is, there may be multiple initial bounding boxes.

Further, in the embodiments of the present disclosure, when the hand gesture detection apparatus performs training of the bounding box detection model, the hand gesture detection apparatus can train a selection processing of the bounding boxes. For example, in the training process, the selection processing of a target bounding box may be selecting and outputting 32 optimal bounding boxes from all the bounding box detection results as the initial bounding boxes.

It can be understood that, in the embodiments of the present disclosure, the bounding box may be used to perform the hand detection processing on the initial depth image. That is, a position and size corresponding to the hand may be determined through the bounding box.

Further, in the embodiments of the present disclosure, the hand gesture detection apparatus uses the backbone feature extractor to perform feature extraction on the initial depth image, and the obtained first feature image is a depth image that only includes the hand to be detected, i.e., the first feature map.

At block 102, a target bounding box is determined based on the initial bounding boxes. The target bounding box is one of the initial bounding boxes.

In the embodiments of the present disclosure, the hand gesture detection apparatus determines the target bounding box based on the initial bounding boxes, after the hand gesture detection apparatus obtains the initial depth image, performs the detection processing on the initial depth image by using the backbone feature extractor and the bounding box detection model to obtain initial bounding boxes and the first feature map corresponding to the hand to be detected.

It should be noted that, in the present disclosure, the target bounding box may be one of the initial bounding boxes. That is, the hand gesture detection apparatus can select one bounding box from the plurality of initial bounding boxes, as the final target bounding box.

Further, in the embodiments of the present disclosure, as the target bounding box, the hand gesture detection apparatus may determine an initial bounding box corresponding to a maximum confidence among the plurality of confidences.

That is to say, in the present disclosure, based on the one-to-one correspondence between the confidences and the initial bounding boxes, the hand gesture detection apparatus may perform a comparison processing on the confidences to determine the maximum confidence, so as to determine the initial bounding box corresponding to the maximum confidence as the target bounding box.

Further, in the embodiments of the present disclosure, when determining the target bounding box based on the initial bounding boxes, the hand gesture detection apparatus may first determine an intersection parameter between the initial bounding boxes. If the intersection parameter is greater than a predetermined intersection threshold, the hand gesture detection apparatus can perform down-sampling processing on the initial bounding boxes to obtain spare bounding boxes; and the hand gesture detection apparatus determines a spare bounding box corresponding to the maximum confidence among the confidences corresponding to the spare bounding boxes, as the target bounding box.

That is to say, in the present disclosure, when determining the target bounding box, the hand gesture detection apparatus may further reduce the number of bounding boxes to be selected by determining the intersection parameter between the initial bounding boxes. Then, the hand gesture detection apparatus selects the target bounding box from the spare bounding boxes obtained by the down-sampling processing. The target bounding box is the spare bounding box with the highest confidence among the spare bounding boxes.

It should be noted that, in the embodiments of the present disclosure, the predetermined intersection threshold is a specific value preset by the hand gesture detection apparatus and used for determining whether to perform the down-sampling processing. For example, the predetermined intersection threshold can be 0.5.

It can be understood that, in the embodiments of the present disclosure, after outputting the plurality of initial bounding boxes by using the bounding box detection model, the hand gesture detection apparatus can further select the spare bounding boxes based on the intersection between the initial bounding boxes. Specifically, the hand gesture detection apparatus can obtain the spare bounding boxes through the down-sampling processing. In the down-sampling process of the bounding boxes, if the intersection parameter of any two initial bounding boxes is greater than 0.5 (i.e., the predetermined intersection threshold), the hand gesture detection apparatus can perform the down-sampling processing on the initial bounding boxes to obtain the spare bounding boxes.

It can be seen that, in the embodiments of the present disclosure, when determining the target bounding box, the hand gesture detection apparatus can either directly select one target bounding box from the plurality of initial bounding boxes based on the confidences corresponding to the initial bounding boxes; or perform the down-sampling processing on the plurality of initial bounding boxes first to obtain a smaller number of spare bounding boxes, and then determine the target bounding box based on the confidences corresponding to the spare bounding boxes.

At block 103, based on the target bounding box, the first feature map is cropped by using an RoIAlign feature extractor, to obtain a second feature map corresponding to the hand to be detected.

In the embodiments of the present disclosure, after the target bounding box is determined based on the initial bounding boxes, the hand gesture detection apparatus may crop, based on the target bounding box, the first feature map by using the RoIAlign feature extractor to obtain the second feature map corresponding to the hand to be detected.

Further, in the embodiments of the present disclosure, when the hand gesture detection apparatus crops, based on the target bounding box, the first feature map by using the RoIAlign feature extractor to obtain the second feature map corresponding to the hand to be detected, the hand gesture detection apparatus can input the target bounding box and the first feature map into the RoIAlign feature extractor, to output the second feature map.

It can be understood that, in the embodiments of the present disclosure, the ROIAlign feature extractor can be configured to perform a shallow feature extraction on the first feature map corresponding to the hand to be detected, which may specifically include a general outline and edge positions of the hand to be detected, so as to obtain an ROIAlign feature map corresponding to the hand to be detected, i.e., the second feature map of the hand to be detected.

Further, in the embodiments of the present disclosure, when the hand gesture detection apparatus crops, based on the target bounding box, the first feature map by using the RoIAlign feature extractor to obtain the second feature map corresponding to the hand to be detected, the hand gesture detection apparatus may first determine a cropping region based on the target bounding box, and then crop, based on the cropping region, the first feature map by using the RoIAlign feature extractor, to obtain the second feature map.

It can be understood that, in the embodiments of the present disclosure, the bounding box may be used to perform hand detection processing on the initial depth image, that is, the position and size corresponding to the hand may be determined by means of the bounding box. Therefore, the hand gesture detection apparatus can first determine the cropping region by using the target bounding box with the highest confidence, then crop the cropping region by using the RoIAlign feature extractor, and finally generate the second feature image.

At block 104, based on the second feature map, three-dimensional gesture estimation processing is performed on the hand to be detected by using the gesture estimation model to obtain a gesture detection result of the hand to be detected.

In the embodiments of the present disclosure, after the hand gesture detection apparatus crops, based on the target bounding box, the first feature map by using the RoIAlign feature extractor to obtain the second feature map corresponding to the to-be-detected hand, the hand gesture detection apparatus can perform, based on the second feature map, the three-dimensional gesture estimation processing on the hand to be detected by using the gesture estimation model to obtain the gesture detection result of the hand to be detected.

Further, in the embodiments of the present disclosure, when the hand gesture detection apparatus performs, based on the second feature map, the three-dimensional gesture estimation processing on the hand to be detected by using the gesture estimation model to obtain the gesture detection result of the hand to be detected, the hand gesture detection apparatus directly inputs the second feature map into the gesture estimation model and outputs the gesture detection result corresponding to the hand to be detected.

It should be noted that, in the present disclosure, the hand gesture detection apparatus performs the gesture detection for the hand to be detected based on the ROIAlign feature map of the hand, i.e., the second feature map of the hand to be detected. Specifically, the ROIAlign feature extractor is configured to perform the shallow feature extraction, that is, the second feature map, which is obtained through feature extraction performed on the first feature map by the hand gesture detection apparatus using the ROIAlign feature extractor, cannot represent deep features of the hand to be detected. Therefore, the hand gesture detection apparatus can further use the gesture estimation model to complete the deep feature extraction of the hand to be detected.

It can be understood that, in the embodiments of the present disclosure, the hand gesture detection apparatus uses the target bounding box and the ROIAlign feature extractor to complete the detection of the hand to be detected, and the obtained detection result is the second feature map corresponding to the hand to be detected. Then, the hand gesture detection apparatus can further use the gesture estimation model to complete gesture estimation of the hand to be detected. The hand gesture detection apparatus performs the gesture estimation processing based on the second feature map. That is, the detection result after the detection processing can be the input of the gesture estimation model to complete the gesture estimation processing.

Figure 10:
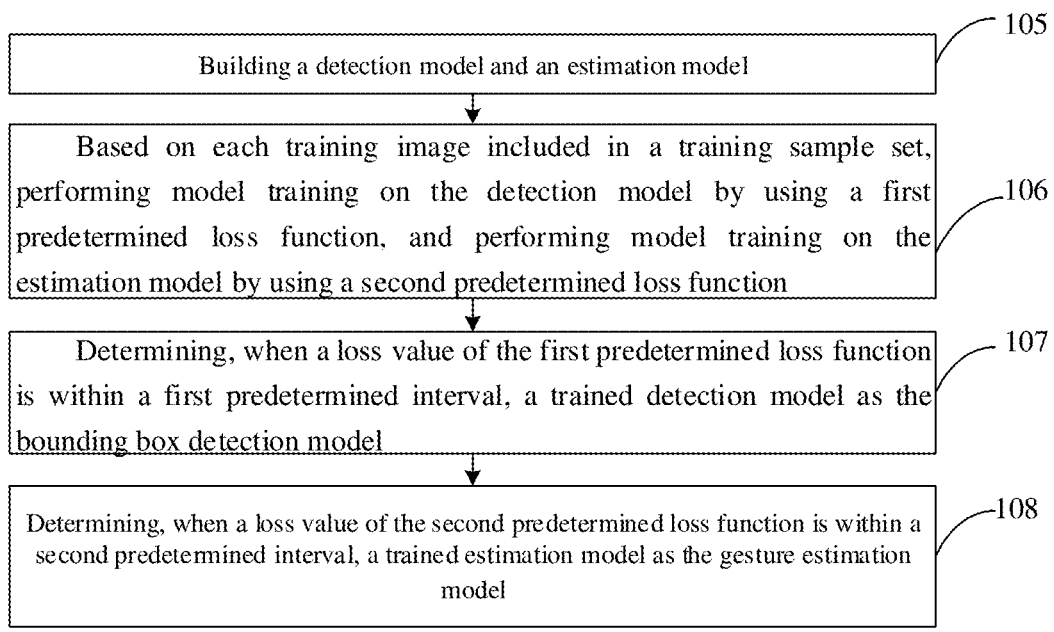
FIG. 10 is a second schematic flowchart of a hand gesture detection method according to an embodiment of the present disclosure.

FIG. 10 is a second schematic flowchart of a hand gesture detection method according to an embodiment of the present disclosure. As illustrated in FIG. 10, in the embodiments of the present disclosure, the hand gesture detection method performed by the hand gesture detection apparatus may further include the following actions in blocks.

At block 105, a detection model and an estimation model are built.

At block 106, based on each of a plurality of training images included in a training sample set, model training is performed on the detection model by using a first predetermined loss function, and model training is performed on the estimation model by using a second predetermined loss function.

At block 107, when a loss value of the first predetermined loss function is within a first predetermined interval, a trained detection model is determined as the bounding box detection model.

At block 108, when a loss value of the second predetermined loss function is within a second predetermined interval, a trained estimation model is determined as the gesture estimation model.

In the embodiments of the present disclosure, the hand gesture detection apparatus may first train the bounding box detection model and the gesture estimation model. The bounding box detection model is used to determine a region corresponding to the hand to be detected, and the gesture estimation model is used to extract deep features of the hand to be detected.

Specifically, in the embodiments of the present disclosure, the hand gesture detection apparatus may first build the detection model and the estimation model. The detection model is used to train the bounding box detection model, and the estimation model is used to train the gesture estimation model.

Further, in the present disclosure, based on each training image in the training sample set, the hand gesture detection apparatus may perform the model training on the detection model by using the first predetermined loss function, and perform the model training on the estimated model by using the second predetermined loss function.

It should be noted that, in the embodiments of the present disclosure, the training sample set may include a plurality of training images. The training sample set can be used to train both the bounding box detection model and the gesture estimation model.

Further, in the embodiments of the present disclosure, during the training of the bounding box detection model, if the loss value of the first predetermined loss function is within the first predetermined interval, the trained detection model can be determined as the bounding box detection model.

Further, in the embodiments of the present disclosure, during the training of the gesture estimation model, if the loss value of the second predetermined loss function is within the second predetermined interval, the trained estimation model can be determined as the gesture estimation model.

In summary, in the embodiments of the present disclosure, through the hand gesture detection method as described in the above blocks 101 to 108, the hand gesture detection apparatus can combine the tasks of the hand detection and the hand gesture estimation. In one aspect, the backbone feature extractor can be used only in the process of hand detection, thereby saving computational cost. In another aspect, the training and inference are consistent, that is, the training and inference are applied on the same bounding box, without requiring an adjustment of the bounding box. In yet another aspect, the hand gesture detection apparatus can use more training samples to perform the hand gesture detection, thereby improving the accuracy.

Figure 11:
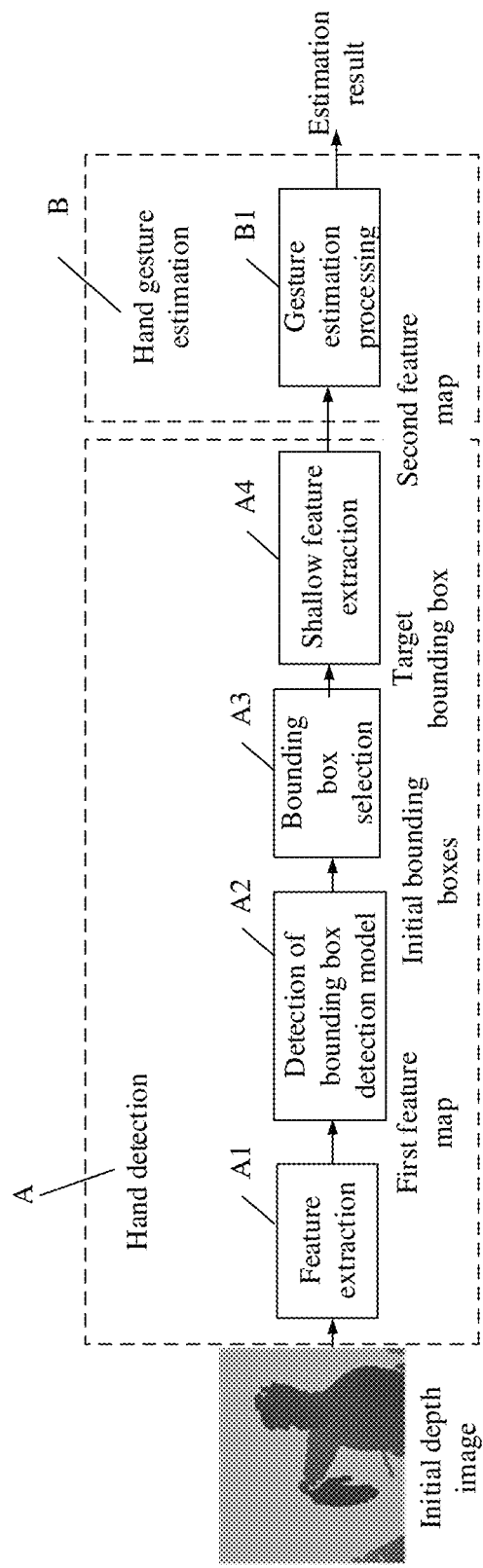
FIG. 11 is a schematic diagram of an architecture of a hand gesture estimation method according to an embodiment of the present disclosure.

FIG. 11 is a schematic diagram of an architecture of the hand gesture estimation method according to an embodiment of the disclosure. As illustrated in FIG. 11, when the hand gesture detection apparatus performs hand gesture detection, it can couple the hand detection (A) with the hand gesture estimation (B). Specifically, the hand gesture detection apparatus can perform feature extraction on an initial depth image through a backbone feature extractor to obtain a first feature map (A1), while it can detect a target (hand) through a bounding box detection model to further determine initial bounding boxes (A2). After a target bounding box is obtained through a bounding box selection processing (A3), that is, after the bounding box with the highest confidence is selected, the hand gesture detection apparatus can further perform a shallow feature extraction on the first feature map (A4) using the target bounding box and an ROIAlign feature extractor to obtain a hand ROIAlign feature map, i.e., a second feature map. Then, based on the second feature map, the hand gesture detection apparatus can continue to process the next task, i.e., the task of performing the hand gesture estimation (B). Specifically, the hand gesture detection apparatus may input the second feature map into the gesture estimation model (B1), and finally obtain a 3D hand gesture estimation result of the hand to be detected.

In this regard, the hand gesture detection method proposed in the embodiments of the present disclosure can realize cascaded hand detection and hand gesture estimation and can combine the hand detection and the hand gesture estimation end-to-end. That is, in the training and detection, the hand gesture detection apparatus uses the ROIAlign feature extractor to connect the output of the hand detection to the input of the hand gesture estimation.

Further, in the embodiments of the present disclosure, the hand gesture detection apparatus can emit a bounding box adjustment for aligning the input for training and inference.

It should be noted that, in the embodiments of the present disclosure, the ROIAlign feature extractor is used to connect the output of hand detection and the input of hand gesture estimation. For example, the backbone feature extractor outputs image feature F with a size of 12×15×256 (height× width×channel), i.e., the first feature map. The bounding box detection model inputs image feature F and outputs the initial bounding boxes, and obtains the target bounding box B after the selection processing. The RoAlign feature extractor crops the image feature F, and a cropped region is defined by the target bounding box B. The RoAlign feature extractor outputs a cropped region-of-interest feature (RoI features, i.e., the second feature map) with a size of 8×8, and the RoI feature is inputted into the next task, which is used for hand gesture estimation processing.

It can be understood that, in the present disclosure, before the ROIAlign feature extraction, the hand gesture detection apparatus needs to perform the selection processing of the target bounding box first. Specifically, the hand gesture detection apparatus may first select the optimal candidate bounding boxes for training; then select the optimal candidate bounding boxes for inference. The bounding boxes with the higher confidence are determined as the optimal bounding boxes if the bounding boxes have higher confidence after applying NMS.

Further, in the present disclosure, when selecting bounding boxes in the training process, 32 optimal bounding boxes may be selected from all bounding box detection results. First, NMS is applied to 1500 bounding box detection results, and 800 bounding boxes with higher confidence are outputted. The 800 bounding boxes are then sampled into 8 bounding boxes. If the bounding boxes have an intersection greater than 0.5, the bounding boxes will be sampled, and the bounding boxes also having the top confidence scores are used for training.

Correspondingly, in the present disclosure, when selecting a bounding box in the inference process, only one bounding box, i.e., the bounding box with the highest confidence, may be output in the inference process.

In the hand gesture detection method provided by the embodiments of the present disclosure, the hand gesture detection apparatus obtains the initial depth image including a hand to be detected, and performs the detection processing on the initial depth image by using a backbone feature extractor and a bounding box detection model, to obtain initial bounding boxes and a first feature map corresponding to the hand to be detected; based on the initial bounding boxes, the hand gesture detection apparatus determines a target bounding box, which is one of the initial bounding boxes; based on the target bounding box, the hand gesture detection apparatus crops the first feature map using an RoIAlign feature extractor, to obtain the second feature map corresponding to the hand to be detected; based on the second feature map, the hand gesture detection apparatus performs three-dimensional gesture estimation processing on the hand to be detected using a gesture estimation model, to obtain a gesture detection result of the hand to be detected. In other words, in the embodiments of the present disclosure, when the hand gesture detection apparatus performs the hand gesture detection processing, it can combine the two tasks of the hand detection and the hand gesture estimation end-to-end. Specifically, the hand gesture detection apparatus can couple the output result of the hand detection with the input end of the hand gesture estimation through the RoIAlign feature extractor, and it can use the second feature map output by the RoIAlign feature extractor as the input of the gesture estimation model to complete the hand gesture detection. In view of the above, in the hand gesture detection method proposed in the embodiments of the present disclosure, the backbone feature extractor is only used to perform one feature extraction on the initial depth image, thereby achieving the joint processing of the hand detection and the hand gesture estimation. Therefore, the amount of computation can be greatly reduced, and the detection efficiency and accuracy of the hand gesture can be effectively improved.

Figure 12:
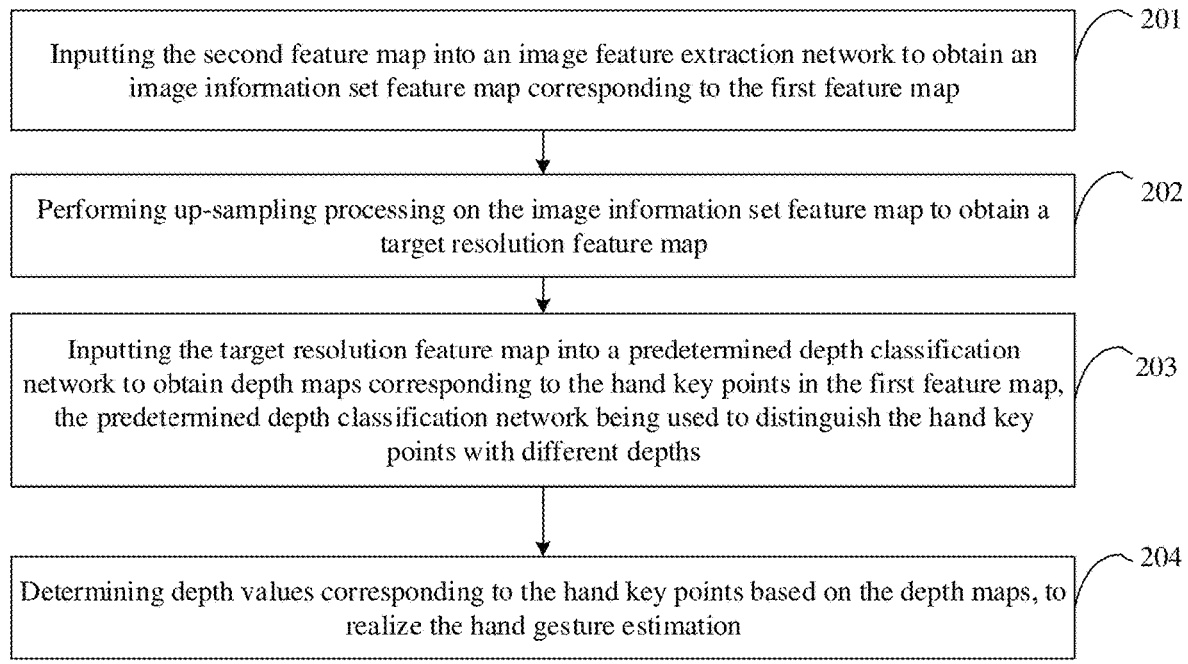
FIG. 12 is a third schematic flowchart of a hand gesture detection method according to an embodiment of the present disclosure.

Based on the above-mentioned embodiments, in yet another embodiment of the present disclosure, FIG. 12 illustrates a third schematic flowchart of a hand gesture detection method according to an embodiment of the present disclosure. As illustrated in FIG. 12, the hand gesture detection method performed by a hand gesture detection apparatus may further include the following actions in blocks.

At block 201, the second feature map is inputted into an image feature extraction network to obtain an image information set feature map corresponding to the first feature map.

In the embodiments of the present disclosure, after the second feature map of the hand is obtained, the hand gesture detection apparatus may input the second feature map into the image feature extraction network to obtain the image information set feature map corresponding to the first feature map.

It should be noted that, in the embodiments of the present disclosure, the second feature map is the extraction of shallow image information such as hand edges and outlines, and the image feature network can extract deep image information such as hand curvature and length.

It can be understood that, after the shallow feature extraction of ROIAlign and the deep feature extraction of the image feature network are performed, all the image information of the hand can be obtained, that is, the image information set feature map corresponding to the first feature map in the embodiment of the present disclosure.

It should be noted that, in the embodiments of the present disclosure, the image feature extraction network includes a first dimensionality reduction network for performing channel reduction on image information, and a deep convolutional network for performing deep feature extraction based on the dimensionality-reduced image information.

Specifically, in order to reduce the amount of computation of processing, the hand gesture detection apparatus can input the second feature map into the first dimensionality reduction network to perform the channel reduction processing on the second feature map through the first dimensionality reduction network, and then it can obtain a first dimensionality-reduced feature map.

The hand gesture detection apparatus can further input the obtained first dimensionality-reduced feature map into the deep convolutional network, to perform deeper image information extraction on the first dimensionality-reduced feature map through the deep convolutional network, and thus it can obtain the image information set feature map.

In an alternative embodiment, in the embodiments of the present disclosure, the deep convolutional network may use an iterative convolutional network in which input and output are superimposed, that is, the input of each layer of the convolutional network is a sum of the input and output of the previous layer of the convolutional network. The same convolutional network can be used for multiple iterative convolution processing, so that the final number of feature maps output through the deep convolutional network is the same as the number of feature maps of the original input. That is to say, the deep convolutional network is only an extraction process of image information without changing the number of image feature maps.

For example, after the hand gesture detection apparatus obtains the second feature map with a size of 8×8×256, the hand gesture detection apparatus can input the 8×8×256 feature map into a 3×3×128 first dimensionality reduction network for channel reduction, so as to obtain an 8×8×128 dimensionality-reduced feature map. The hand gesture detection apparatus can further input the 8×8×128 dimensionality-reduced feature map into a deep convolutional network with four convolution layers, whose inputs and outputs are superimposed, to extract the image information, thereby obtaining an 8×8×128 image information set feature map with the same number of dimensionality-reduced feature maps.

Further, in the embodiments of the present disclosure, after obtaining the image information set feature map, the hand gesture detection apparatus may further perform up-sampling processing on the image information set feature map.

At block 202, up-sampling processing is performed on the image information set feature map to obtain a target resolution feature map.

In the embodiments of the present disclosure, after obtaining the image information set feature map, the hand gesture detection apparatus may further perform the up-sampling processing on the image information set feature map, in order to obtain the target resolution feature map.

It can be understood that the processes of performing the ROIAlign shallow feature extraction, first dimensionality reduction processing, and deep feature extraction processing corresponding to the deep convolutional network on the image are processes for reducing a resolution of an original image. In the embodiments of the present disclosure, the hand gesture detection apparatus may enhance the resolution of the image information set feature map by the up-sampling, i.e., a deconvolution processing, in order to avoid a loss of image information, which may occur in the subsequent depth estimation on the low-resolution feature map.

In an alternative embodiment, the resolution of the image information set feature map can be increased to the same as the resolution of the initial depth feature map, or the same as the resolution of the first feature map after the bounding box detection, so as to obtain the corresponding target resolution feature map.

For example, assuming that the initial depth image or the first feature map is with a size of 16×16×128, the hand gesture detection apparatus needs to perform 2 times up-sampling processing on the image information feature map with a size of 8×8×128, in order to obtain the target resolution feature map with a size of 16×16×128.

Further, in the embodiments of the present disclosure, after obtaining the target resolution feature map through the up-sampling processing, the hand gesture detection apparatus may further perform classification processing on a depth interval of the hand key points in the hand depth image based on the target resolution feature map.

At block 203, the target resolution feature map is inputted into a predetermined depth classification network to obtain depth maps corresponding to the hand key points in the first feature map. The predetermined depth classification network is used to distinguish the hand key points with different depths.

In the embodiments of the present disclosure, after obtaining the target resolution feature map, the hand gesture detection apparatus may input the target resolution feature map into a predetermined depth classification network, so as to further obtain the depth map corresponding to each hand key point in the hand depth image.

It can be understood that when the human hand performs a certain gesture action, the corresponding positions, curvatures and gestures of respective fingers are different. In this regard, when the hand is in a specific position, an interval distance, i.e. a depth interval value, between the same finger of the hand and a position such as the head, chest, or eye of the human body may be different, and the interval values corresponding to different fingers of the hand are more different. In the embodiments of the present disclosure, the hand gesture detection apparatus may set the positions of the hand key points, and classify each hand key point based on different depth intervals.

Specifically, in the embodiments of the present disclosure, the hand gesture detection apparatus may establish the predetermined depth classification network, and then classify the hand key points based on different depth intervals through the depth classification network. That is, the hand gesture detection apparatus distinguishes the hand key points with different depths through the predetermined depth classification network.

It should be noted that, in the embodiments of the present disclosure, depth maps refer to pictures or channels including distance information of the hand key points, that is, the depth interval values.

Specifically, in the embodiments of the present disclosure, the predetermined depth classification network can set the number of the hand key points and different depth interval reference values. The process of inputting the target resolution feature map obtained after the deep feature extraction and the up-sampling processing into the predetermined depth classification network is a process of roughly predicting the depth interval value of each key point. Then, the hand key points are classified based on the predicted depth interval values to generate the depth maps including the predicted depth interval values corresponding to the hand key points. That is to say, through the predetermined depth classification network, the depth interval values corresponding to N hand key points can be roughly predicted first, and different depth interval values correspond to different depth maps.

In an alternative embodiment, the hand gesture detection apparatus may predefine 20 key points, and after inputting the target resolution feature map into the predetermined depth classification network, the hand gesture detection apparatus can obtain 20 depth maps, which correspond to the 20 key points and include the predicted depth interval values corresponding to the 20 key points.

Further, in the embodiments of the present disclosure, after obtaining the depth map corresponding to the hand key point, the hand gesture detection apparatus may further determine a real depth value corresponding to the key point based on the depth map.

At block 204, depth values corresponding to the hand key points are determined based on the depth maps, to realize the hand gesture estimation.

In the embodiments of the present disclosure, after the hand gesture detection apparatus obtains the depth maps corresponding to the hand key points, the hand gesture detection apparatus may determine the depth values corresponding to the hand key points based on the depth maps, and further implement the hand gesture estimation based on the depth values.

It can be understood that, since the depth map includes the depth interval value corresponding to each hand key point, the hand gesture detection apparatus can further determine depth coordinate of the hand key point based on the depth interval value of each hand key point depth map.

It can be seen that, in the embodiments of the present disclosure, the depth interval value corresponding to each hand key point is roughly predicted, and the hand key points are classified by means of the depth classification, so that the depth value corresponding to the hand key point is determined based on the depth interval value with higher accuracy, thereby achieving an accurate and efficient depth estimation of hand gesture.

In the hand gesture detection method provided by the embodiments of the present disclosure, the hand gesture detection apparatus obtains the initial depth image including a hand to be detected, and performs the detection processing on the initial depth image by using a backbone feature extractor and a bounding box detection model, to obtain initial bounding boxes and a first feature map corresponding to the hand to be detected; based on the initial bounding boxes, the hand gesture detection apparatus determines a target bounding box, which is one of the initial bounding boxes; based on the target bounding box, the hand gesture detection apparatus crops the first feature map using an RoIAlign feature extractor, to obtain the second feature map corresponding to the hand to be detected; based on the second feature map, the hand gesture detection apparatus performs three-dimensional gesture estimation processing on the hand to be detected using a gesture estimation model, to obtain a gesture detection result of the hand to be detected. In other words, in the embodiments of the present disclosure, when the hand gesture detection apparatus performs the hand gesture detection processing, it can combine the two tasks of the hand detection and the hand gesture estimation end-to-end. Specifically, the hand gesture detection apparatus can couple the output result of the hand detection with the input end of the hand gesture estimation through the RoIAlign feature extractor, and it can use the second feature map output by the RoIAlign feature extractor as the input of the gesture estimation model to complete the hand gesture detection. In view of the above, in the hand gesture detection method proposed in the embodiments of the present disclosure, the backbone feature extractor is only used to perform one feature extraction on the initial depth image, thereby achieving the joint processing of the hand detection and the hand gesture estimation. Therefore, the amount of computation can be greatly reduced, and the detection efficiency and accuracy of the hand gesture can be effectively improved.

Figure 13:
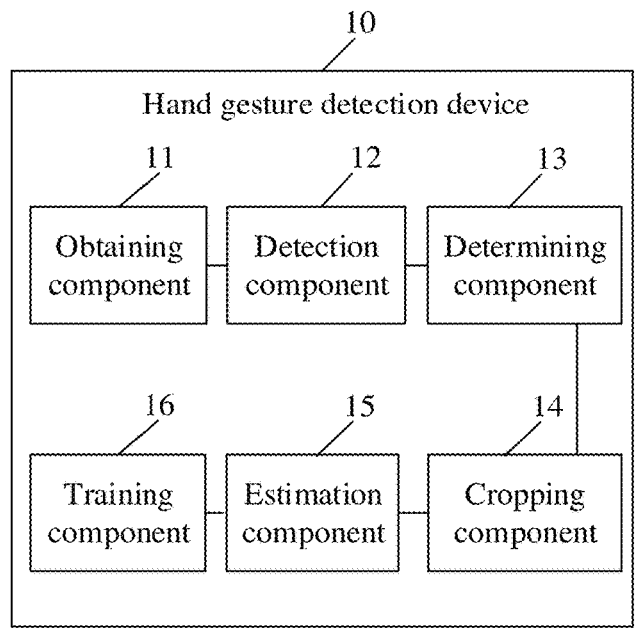
FIG. 13 is a first schematic diagram of a structural composition of a hand gesture detection apparatus according to an embodiment of the present disclosure.

Based on the above-mentioned embodiments, in another embodiment of the present disclosure, FIG. 13 is a first schematic diagram of a structural composition of a hand gesture detection apparatus according to an embodiment of the present disclosure. As illustrated in FIG. 13, the hand gesture detection apparatus 10 proposed by the embodiment of the present disclosure may include an obtaining component 11, a detection component 12, a determining component 13, a cropping component 14, an estimation component 15, and a training component 16.

The obtaining component 11 is configured to obtain an initial depth image including a hand to be detected.

The detection component 12 is configured to perform detection processing on the initial depth image by using a backbone feature extractor and a bounding box detection model to obtain initial bounding boxes and a first feature map corresponding to the hand to be detected.

The determining component 13 is configured to determine a target bounding box based on the initial bounding boxes. The target bounding box is one of the initial bounding boxes.

The cropping component 14 is configured to crop, based on the target bounding box, the first feature map by using an RoIAlign feature extractor to obtain a second feature map corresponding to the hand to be detected.

The estimation component 15 is configured to perform, based on the second feature map, a three-dimensional gesture estimation processing on the hand to be detected by using a gesture estimation model to obtain a gesture detection result of the hand to be detected.

Further, in the embodiments of the present disclosure, the detection component 12 is specifically configured to: input the initial depth image into the backbone feature extractor and output the first feature map; and obtain, based on the first feature map, the initial bounding boxes by using the bounding box detection model.

Further, in the embodiments of the present disclosure, the detection component 12 is further specifically configured to: input the first feature map into the bounding box detection model, and output a plurality of bounding boxes and a plurality of confidences corresponding to the plurality of bounding boxes in one-to-one correspondence; and determine, based on the plurality of confidences, a part of the plurality of bounding boxes in the plurality of bounding boxes as the initial bounding boxes.

Further, in the embodiments of the present disclosure, the determining component 13 is specifically configured to determine, as the target bounding box, an initial bounding box corresponding to a maximum confidence among the plurality of confidences corresponding to the initial bounding boxes.

Further, in the embodiments of the present disclosure, the determining component 13 is specifically configured to: determine an intersection parameter between the initial bounding boxes; down-sample the initial bounding boxes to obtain spare bounding boxes when the intersection parameter is greater than a predetermined intersection threshold; and determine, as the target bounding box, a bounding box corresponding to a maximum confidence among the plurality of confidences corresponding to the spare bounding boxes.

Further, in the embodiments of the present disclosure, the cropping component 14 is specifically configured to input the target bounding box and the first feature map into the RoIAlign feature extractor, and output the second feature map.

Further, in the embodiments of the present disclosure, the cropping component 14 is further specifically configured to determine a cropping region based on the target bounding box; and crop, based on the cropping region, the first feature map by using the RoIAlign feature extractor to obtain the second feature map.

Further, in the embodiments of the present disclosure, the estimation component 15 is specifically configured to input the second feature map into the gesture estimation model, and output the gesture detection result.

Further, in the embodiments of the present disclosure, the training component 16 is configured to: build a detection model and an estimation model; based on each of a plurality of training images included in a training sample set, perform model training on the detection model by using a first predetermined loss function, and perform model training on the estimation model by using a second predetermined loss function; determine, when a loss value of the first predetermined loss function is within a first predetermined interval, a trained detection model as the bounding box detection model; or determine, when a loss value of the second predetermined loss function is within a second predetermined interval, a trained estimation model as the gesture estimation model.

Figure 14:
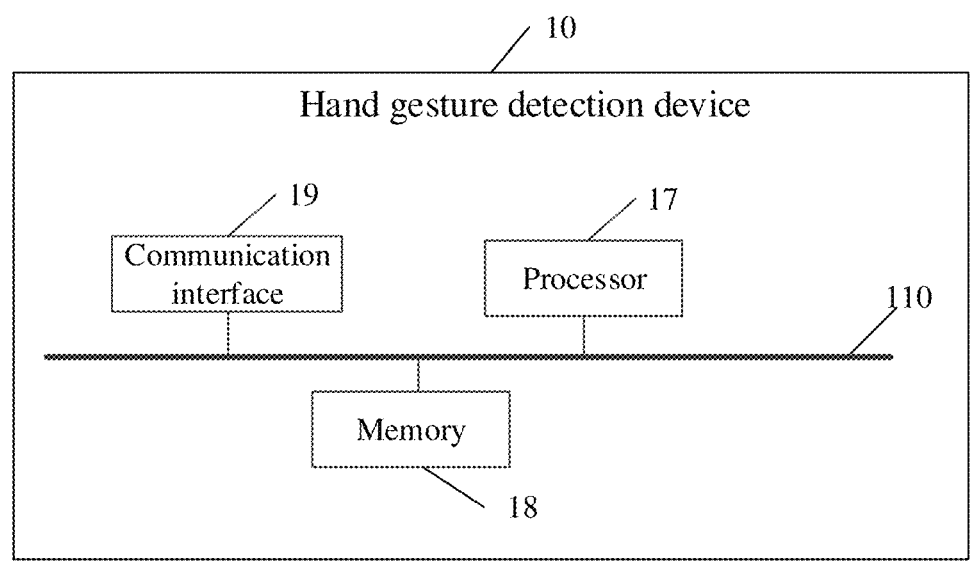
FIG. 14 is a second schematic diagram of a structural composition of a hand gesture detection apparatus according to an embodiment of the present disclosure.

In the embodiments of the present disclosure, FIG. 14 is a second schematic diagram of a structural composition of a hand gesture detection apparatus according to an embodiment of the present disclosure. As illustrated in FIG. 14, the hand gesture detection apparatus 10 proposed by the embodiment of the present disclosure may include a processor 17, and a memory 18 having instructions stored thereon and being executable by the processor 17. Further, the hand gesture detection apparatus 10 can further include a communication interface 19, and a bus 110 for connecting the processor 17, the memory 18 and the communication interface 19.

In the embodiments of the present disclosure, the above-mentioned processor 17 may be at least one of an Application Specific Integrated Circuit (ASIC), a Digital Signal Processor (DSP), or a Digital Signal Processing Device (DSPD), a Programmable Logic Device (PLD), a Field Programmable Gate Array (FPGA), a Central Processing Unit (CPU), a controller, or a microcontroller. It can be understood that, for different apparatuses, the electronic apparatus used to implement the above processor function may also be others and is not specifically limited to any of these examples in the embodiments of the present disclosure. The hand gesture detection apparatus 10 may include a memory 18, which may be connected to the processor 17. The memory 18 is used to store executable program codes, including computer operating instructions. The memory 18 may include a high-speed RAM memory, or a non-volatile memory, e.g., at least two disk storages.

In the embodiments of the present disclosure, the bus 110 is used to connect the communication interface 19, the processor 17 and the memory 18, for the mutual communication of these devices.

In the embodiments of the present disclosure, the memory 18 is used for storing instructions and data.

Further, in the embodiments of the present disclosure, the above-mentioned processor 17 is configured to obtain an initial depth image including a hand to be detected, and perform detection processing on the initial depth image by using a backbone feature extractor and a bounding box detection model, to obtain initial bounding boxes and a first feature map corresponding to the hand to be detected; determine a target bounding box based on the initial bounding boxes, the bounding box being one of the initial bounding boxes; crop, based on the target bounding box, the first feature map by using an RoIAlign feature extractor, to obtain a second feature map corresponding to the hand to be detected; and perform, based on the second feature map, a three-dimensional gesture estimation processing on the hand to be detected by using a gesture estimation model to obtain a gesture detection result of the hand to be detected.

In practical applications, the above-mentioned memory 18 may be a volatile memory, such as a Random-Access Memory (RAM); or a non-volatile memory such as a Read-Only Memory (ROM), a flash memory, a Hard Disk Drive (HDD) or a Solid-State Drive (SSD); or a combination of the above types of memory, and provide instructions and data to the processor 17.

In addition, in the present embodiment, each functional module may be integrated into one processing unit, or each unit may exist physically alone, or two or more units may be integrated into one unit. The above-mentioned integrated units can be implemented in the form of hardware, or can be implemented in the form of software function modules.

If the integrated unit is implemented in the form of software function module and is not sold or used as an independent product, the integrated unit can be stored in a computer-readable storage medium. In this regard, the technical solution of the embodiment or the part that contributes to the prior art, or all or part of the technical solution can be embodied in the form of a software product. The computer software product is stored in a storage medium, and includes several instructions to enable a computer device (a personal computer, a server, or a network device, etc.) or a processor execute all or part of the steps of the method in the embodiments. The aforementioned storage medium includes a U disk, a mobile hard disk, an ROM, an RAM, a magnetic disk or an optical disk and other media that can store program codes.

In the hand gesture detection method provided by the embodiments of the present disclosure, the hand gesture detection apparatus obtains the initial depth image including a hand to be detected, and performs the detection processing on the initial depth image by using a backbone feature extractor and a bounding box detection model, to obtain initial bounding boxes and a first feature map corresponding to the hand to be detected; based on the initial bounding boxes, the hand gesture detection apparatus determines a target bounding box, which is one of the initial bounding boxes; based on the target bounding box, the hand gesture detection apparatus crops the first feature map using an RoIAlign feature extractor, to obtain the second feature map corresponding to the hand to be detected; based on the second feature map, the hand gesture detection apparatus performs three-dimensional gesture estimation processing on the hand to be detected using a gesture estimation model, to obtain a gesture detection result of the hand to be detected. In other words, in the embodiments of the present disclosure, when the hand gesture detection apparatus performs the hand gesture detection processing, it can combine the two tasks of the hand detection and the hand gesture estimation end-to-end. Specifically, the hand gesture detection apparatus can couple the output result of the hand detection with the input end of the hand gesture estimation through the RoIAlign feature extractor, and it can use the second feature map output by the RoIAlign feature extractor as the input of the gesture estimation model to complete the hand gesture detection. In view of the above, in the hand gesture detection method proposed in the embodiments of the present disclosure, the backbone feature extractor is only used to perform one feature extraction on the initial depth image, thereby achieving the joint processing of the hand detection and the hand gesture estimation. Therefore, the amount of computation can be greatly reduced, and the detection efficiency and accuracy of the hand gesture can be effectively improved.

An embodiment of the present disclosure provides a computer-readable storage medium, on which a program is stored. When the program is executed by a processor, the program implements the above-described hand gesture estimation method.

Specifically, the program instructions corresponding to the hand gesture estimation method in the embodiment can be stored on a storage medium such as an optical disc, a hard disk, or a U disk. When the program instructions corresponding to the calculation method in the storage medium are read or executed by an electronic device, it includes the following actions: obtaining an initial depth image comprising a hand to be detected, and performing detection processing on the initial depth image by using a backbone feature extractor and a bounding box detection model, to obtain initial bounding boxes and a first feature map corresponding to the hand to be detected; determining a target bounding box based on the initial bounding boxes, the target bounding box being one of the initial bounding boxes; cropping, based on the target bounding box, the first feature map by using an RoIAlign feature extractor, to obtain a second feature map corresponding to the hand to be detected; and performing, based on the second feature map, a three-dimensional gesture estimation processing on the hand to be detected by using a gesture estimation model to obtain a gesture detection result of the hand to be detected.

It can be appreciated by those skilled in the art that, the embodiments of the present disclosure may be provided as a method, a system, or a computer program product. Accordingly, the present disclosure may be in the form of a hardware embodiment, a software embodiment, or an embodiment combining software and hardware aspects. Furthermore, the present disclosure may take the form of a computer program product embodied on one or more computer-usable storage media (including but not limited to a disk storage, an optical storage, and the like) having computer-usable program codes included therein.

The present disclosure is described with reference to schematic flowcharts and/or block diagrams of implementations of methods, devices (systems), and computer program products according to the embodiments of the present disclosure. It can be understood that each process and/or block in the schematic flowcharts and/or block diagrams, and combinations of processes and/or blocks in the schematic flowcharts and/or block diagrams, can be implemented by computer program instructions. These computer program instructions may be provided to a processor of a general purpose computer, special purpose computer, embedded processor or other programmable data processing device to produce a machine. In this way, the instructions executed by the processor of the computer or other programmable data processing device produce means for implementing the functions specified in one or more processes in the schematic flowcharts and/or one or more blocks in the block diagrams.

These computer program instructions may be stored in a computer-readable memory capable of causing a computer or other programmable data processing devices to function in a particular manner, such that the instructions stored in the computer-readable memory may result in an article of manufacture including instruction means, the instruction means can implement the functions specified in one or more processes in the schematic flowcharts and/or one or more blocks in the block diagrams.

These computer program instructions can be loaded on a computer or other programmable data processing devices to cause a series of operational steps to be performed on the computer or other programmable devices to produce a computer-implemented process, such that the instructions executed in the computer or the other programmable data processing devices provide steps for implementing the functions specified in one or more processes in the schematic flowcharts or one or more blocks in the block diagrams. The above are merely the preferable embodiments of the present disclosure, but is not intended to limit the protection scope of the present disclosure.

INDUSTRIAL APPLICABILITY

In the hand gesture detection method and device as well as the computer storage medium provided by the embodiments of the present disclosure, the hand gesture detection apparatus obtains the initial depth image including a hand to be detected, and performs the detection processing on the initial depth image by using a backbone feature extractor and a bounding box detection model, to obtain initial bounding boxes and a first feature map corresponding to the hand to be detected; based on the initial bounding boxes, the hand gesture detection apparatus determines a target bounding box, which is one of the initial bounding boxes; based on the target bounding box, the hand gesture detection apparatus crops the first feature map using an RoIAlign feature extractor, to obtain the second feature map corresponding to the hand to be detected; based on the second feature map, the hand gesture detection apparatus performs three-dimensional gesture estimation processing on the hand to be detected using a gesture estimation model, to obtain a gesture detection result of the hand to be detected. In other words, in the embodiments of the present disclosure, when the hand gesture detection apparatus performs the hand gesture detection processing, it can combine the two tasks of the hand detection and the hand gesture estimation end-to-end. Specifically, the hand gesture detection apparatus can couple the output result of the hand detection with the input end of the hand gesture estimation through the RoIAlign feature extractor, and it can use the second feature map output by the RoIAlign feature extractor as the input of the gesture estimation model to complete the hand gesture detection. In view of the above, in the hand gesture detection method proposed in the embodiments of the present disclosure, the backbone feature extractor is only used to perform one feature extraction on the initial depth image, thereby achieving the joint processing of the hand detection and the hand gesture estimation. Therefore, the amount of computation can be greatly reduced, and the detection efficiency and accuracy of the hand gesture can be effectively improved.

What is claimed is:

1. A hand gesture detection method, comprising:
   obtaining an initial depth image comprising a hand to be detected, and performing detection processing on the initial depth image by using a backbone feature extractor and a bounding box detection model, to obtain initial bounding boxes and a first feature map corresponding to the hand to be detected;
   determining a target bounding box based on the initial bounding boxes, the target bounding box being one of the initial bounding boxes;
   cropping, based on the target bounding box, the first feature map by using an RoIAlign feature extractor, to obtain a second feature map corresponding to the hand to be detected; and
   performing, based on the second feature map, a three-dimensional gesture estimation processing on the hand to be detected by using a gesture estimation model to obtain a gesture detection result of the hand to be detected.

2. The method according to claim 1, wherein said performing the detection processing on the initial depth image by using the backbone feature extractor and the bounding box detection model, to obtain the initial bounding boxes and the first feature map corresponding to the hand to be detected comprises:
   inputting the initial depth image into the backbone feature extractor, and outputting the first feature map; and
   obtaining, based on the first feature map, the initial bounding boxes by using the bounding box detection model.

3. The method according to claim 2, wherein said obtaining, based on the first feature map, the initial bounding boxes by using the bounding box detection model comprises:
   inputting the first feature map into the bounding box detection model, and outputting a plurality of bounding boxes and a plurality of confidences corresponding to the plurality of bounding boxes in one-to-one correspondence; and
   determining, based on the plurality of confidences, a part of the plurality of bounding boxes in the plurality of bounding boxes as the initial bounding boxes.

4. The method according to claim 2, wherein said determining the target bounding box based on the initial bounding boxes comprises:
   determining, as the target bounding box, an initial bounding box corresponding to a maximum confidence among the plurality of confidences corresponding to the initial bounding boxes.

5. The method of claim 3, wherein said determining the target bounding box based on the initial bounding boxes comprises:
   determining an intersection parameter between the initial bounding boxes;
   down-sampling, when the intersection parameter is greater than a predetermined intersection threshold, the initial bounding boxes to obtain spare bounding boxes; and determining, as the target bounding box, a bounding box corresponding to a maximum confidence among the plurality of confidences corresponding to the spare bounding boxes.

6. The method according to claim 1, wherein said cropping, based on the target bounding box, the first feature map by using the RoIAlign feature extractor to obtain the second feature map corresponding to the hand to be detected comprises:
inputting the target bounding box and the first feature map into the RoIAlign feature extractor, and outputting the second feature map.

7. The method according to claim 6, wherein said cropping, based on the target bounding box, the first feature map by using the RoIAlign feature extractor to obtain the second feature map corresponding to the hand to be detected comprises:
determining a cropping region based on the target bounding box; and
cropping, based on the cropping region, the first feature map by using the RoIAlign feature extractor to obtain the second feature map.

8. The method according to claim 1, wherein said performing, based on the second feature map, the three-dimensional gesture estimation processing on the hand to be detected by using the gesture estimation model to obtain the gesture detection result of the hand to be detected comprises:
inputting the second feature map into the gesture estimation model, and outputting the gesture detection result.

9. The method according to claim 1, further comprising:
building a detection model and an estimation model;
based on each of a plurality of training images comprised in a training sample set, performing model training on the detection model by using a first predetermined loss function, and performing model training on the estimation model by using a second predetermined loss function;
determining, when a loss value of the first predetermined loss function is within a first predetermined interval, a trained detection model as the bounding box detection model; and
determining, when a loss value of the second predetermined loss function is within a second predetermined interval, a trained estimation model as the gesture estimation model.

10. A hand gesture detection apparatus, comprising:
a processor; and
a memory having instructions stored thereon and executable by the processor, wherein the instructions, when executed by the processor, implement a hand gesture detection method comprising:
obtaining an initial depth image comprising a hand to be detected, and performing detection processing on the initial depth image by using a backbone feature extractor and a bounding box detection model, to obtain initial bounding boxes and a first feature map corresponding to the hand to be detected;
determining a target bounding box based on the initial bounding boxes, the target bounding box being one of the initial bounding boxes;
cropping, based on the target bounding box, the first feature map by using an RoIAlign feature extractor, to obtain a second feature map corresponding to the hand to be detected; and
performing, based on the second feature map, a three-dimensional gesture estimation processing on the hand to be detected by using a gesture estimation model to obtain a gesture detection result of the hand to be detected.

11. The apparatus according to claim 10, wherein the instructions, when executed by the processor, implement:
inputting the initial depth image into the backbone feature extractor, and outputting the first feature map; and
obtaining, based on the first feature map, the initial bounding boxes by using the bounding box detection model.

12. The apparatus according to claim 11, wherein the instructions, when executed by the processor, implement:
inputting the first feature map into the bounding box detection model, and outputting a plurality of bounding boxes and a plurality of confidences corresponding to the plurality of bounding boxes in one-to-one correspondence; and
determining, based on the plurality of confidences, a part of the plurality of bounding boxes in the plurality of bounding boxes as the initial bounding boxes.

13. The apparatus according to claim 11, wherein the instructions, when executed by the processor, implement:
determining, as the target bounding box, an initial bounding box corresponding to a maximum confidence among the plurality of confidences corresponding to the initial bounding boxes.

14. The apparatus according to claim 13, wherein the instructions, when executed by the processor, implement:
determining an intersection parameter between the initial bounding boxes;
down-sampling, when the intersection parameter is greater than a predetermined intersection threshold, the initial bounding boxes to obtain spare bounding boxes; and
determining, as the target bounding box, a bounding box corresponding to a maximum confidence among the plurality of confidences corresponding to the spare bounding boxes.

15. The apparatus according to claim 10, wherein the instructions, when executed by the processor, implement:
inputting the target bounding box and the first feature map into the RoIAlign feature extractor, and outputting the second feature map.

16. The apparatus according to claim 15, wherein the instructions, when executed by the processor, implement:
determining a cropping region based on the target bounding box; and
cropping, based on the cropping region, the first feature map by using the RoIAlign feature extractor to obtain the second feature map.

17. The apparatus according to claim 10, wherein the instructions, when executed by the processor, implement:
inputting the second feature map into the gesture estimation model, and outputting the gesture detection result.

18. The apparatus according to claim 10, wherein the instructions, when executed by the processor, further implement:
building a detection model and an estimation model;
based on each of a plurality of training images comprised in a training sample set, performing model training on the detection model by using a first predetermined loss function, and performing model training on the estimation model by using a second predetermined loss function;

determining, when a loss value of the first predetermined loss function is within a first predetermined interval, a trained detection model as the bounding box detection model; and determining, when a loss value of the second predetermined loss function is within a second predetermined interval, a trained estimation model as the gesture estimation model.

19. A non-transitory computer-readable storage medium, having a program stored thereon and applied to a hand gesture detection apparatus, wherein the program, when executed by a processor, implements a hand gesture detection method comprising:

obtaining an initial depth image comprising a hand to be detected, and performing detection processing on the initial depth image by using a backbone feature extractor and a bounding box detection model, to obtain initial bounding boxes and a first feature map corresponding to the hand to be detected;

determining a target bounding box based on the initial bounding boxes, the target bounding box being one of the initial bounding boxes;

cropping, based on the target bounding box, the first feature map by using an RoIAlign feature extractor, to obtain a second feature map corresponding to the hand to be detected; and performing, based on the second feature map, a three-dimensional gesture estimation processing on the hand to be detected by using a gesture estimation model to obtain a gesture detection result of the hand to be detected.

* * * * *